June 10, 1952 R. G. HOARE 2,599,831
SHOCK ABSORBER
Filed Oct. 11, 1948
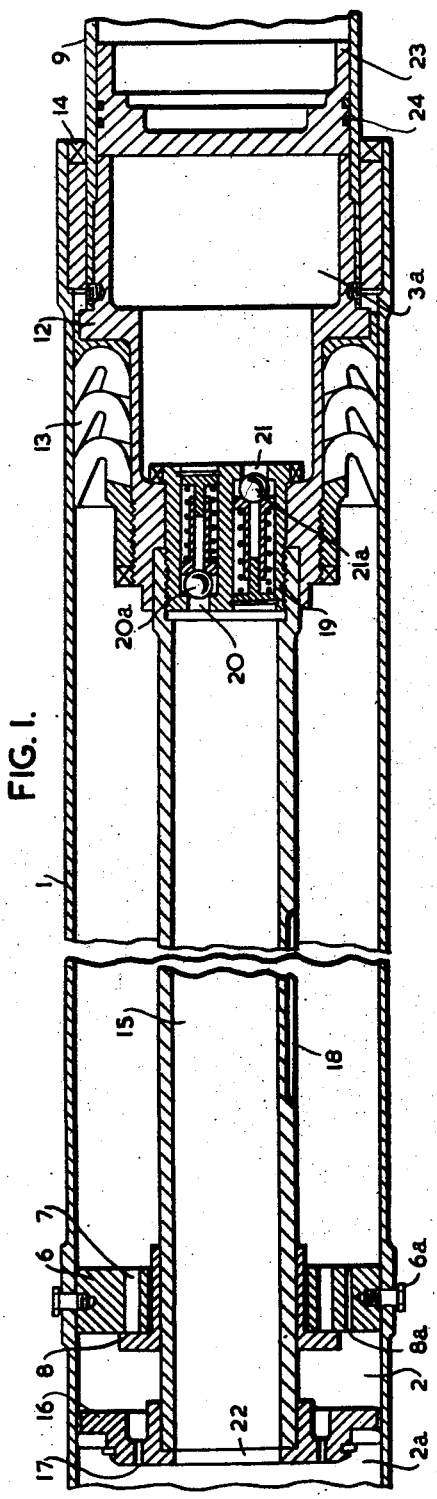
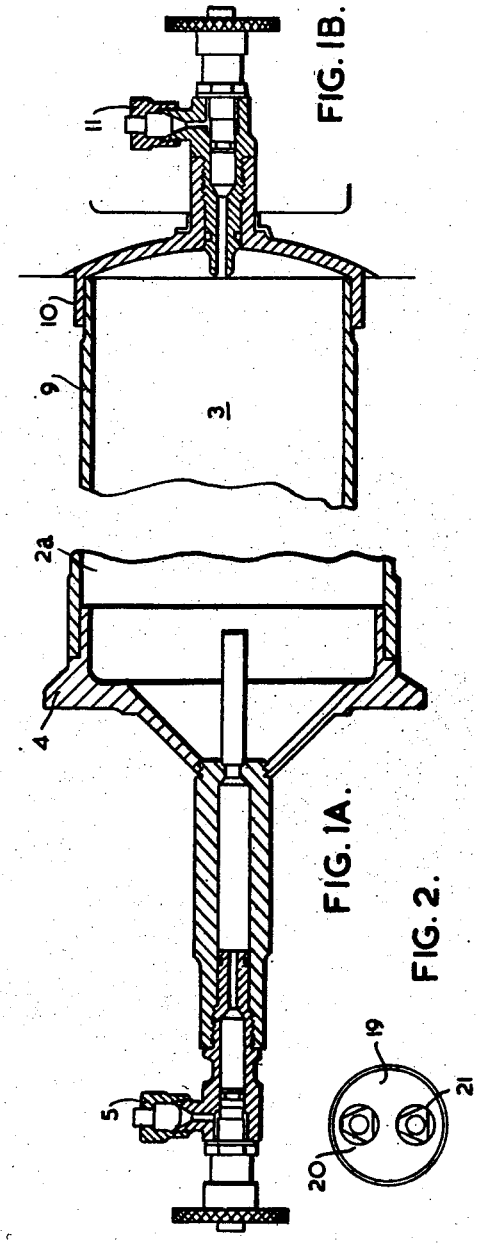

Patented June 10, 1952

2,599,831

UNITED STATES PATENT OFFICE 2,599,831

SHOCK ABSORBER

Robert George Hoare, Warrington, England, assignor to Electro-Hydraulics Limited, Warrington, England, a company of Great Britain Application October 11, 1948, Serial No. 53,833
In Great Britain October 16, 1947

11 Claims. (Cl. 267—64)

This invention relates to shock absorbers of the type in which fluid is contained in a deformable chamber within the shock absorber cylinder, the chamber being in communication with a second chamber through an orifice or orifices which may be valved. The space in this second chamber is spring controlled by the normally provided main spring in a conventional shock absorber in such a way that if the first chamber is deformed so as to force fluid through the orifices into the second chamber, the main spring is strained, and will, on the removal of the deforming force or part thereof, drive the fluid or part of it back into the first chamber. The spring may comprise deformable solids, e. g. coil or rubber rings, or gas separated from the fluid in the shock absorber, e. g. by a floating piston, and is preferably air when the damping fluid is a liquid.

This invention is concerned with providing a shock absorber of the type described which is particularly suitable for use in aircraft undercarriage equipment. It is appreciated that when brakes are suddenly applied to the main wheels of a tricycle undercarriage during taxying, the aircraft tends to pitch forward onto the nose wheel. The pitching inertia of the machine applies slow closure to the nose wheel shock absorber, and the kinetic energy of the aircraft, due to the pitching, must be absorbed in the nose wheel tyre and the shock absorber. As the movement is slow, the damping effect, due to the orifices in the shock absorber, is small, and this kinetic energy is, therefore, normally absorbed only by the tyre and the spring in the shock absorber, e. g. due to the compression of a volume of air. As the energy that can be absorbed in this way is less than that which would be absorbed by the damping orifices and air compression in normal closure, it frequently happens that either the spring in the shock absorber is compressed to give an excessive reaction, or more commonly that the shock absorber abutment faces close, so that it forms a rigid strut, with consequent undesirable results.

In a shock absorber of the type described according to the present invention, a third chamber is provided which is also spring controlled and is in ported or valved communication with the second chamber, the arrangement being such that in the event of fluid pressure in the second chamber rising to a predetermined level, further damping is effected by communication between the said second and third chambers. This additional energy absorption or damping element comprises an additional spring which comes into use when the main spring is compressed to a certain extent. In effect, therefore, it enables the spring element to have a high spring rate or compression ratio in the case of a fluid spring, during the early part of its travel and a reduced rate towards the end of its travel.

The ported communication between the second and third chambers may include a relief valve, the setting of the relief valve and the pressure in the third chamber being such that when once this pressure has been reached in the second chamber a relatively large amount of fluid may pass from the second chamber to the third chamber without any considerable increase in the pressure in the second chamber.

The invention as applied to an oleo-pneumatic shock absorber is diagrammatically illustrated in the accompanying drawing in which Figure 1 is a longitudinal section (partly broken away at the centre and its ends) of the shock absorber, Figures 1A and 1B being respectively sections of the shock absorber at the inflation end and the opposite end, whilst Figure 2 is a detail of a secondary diaphragm.

Referring to the drawing the shock absorber comprises a main cylinder 1, which comprises a first chamber which is deformable in length by means of a sliding piston and is filled with oil.

The second chamber comprises a space 2 containing oil and a second space 2a containing or mainly containing compressed air, which acts as a spring, the said spaces being separated by an annular counter piston which will be described in detail below. The third chamber similarly comprises two spaces 3, 3a, the space 3 containing compressed air which acts as another spring, the said spaces being separated by a floating piston to be described below.

The main cylinder 1 is formed at one end to retain a fluid-tight attachment 4 and an inflation valve 5. A diaphragm or partition 6 is fixed to the cylinder, for example by fluid-tight screws 6a, to divide the first and second chambers and is provided with a damping orifice 7 controlled by a flap valve 8 and one or more restrictor orifices 8a which orifices allow communication from one side of the diaphragm to the other, that is between the first and second chambers 1, 2.

Within the cylinder is mounted a sliding assembly which comprises a hollow piston rod 9 to which is secured a fluid-tight attachment 10 and which is provided with a secondary inflation valve 11. The hollow piston rod, which constitutes the third chamber, terminates in a hollow piston 12 sliding with its piston ring 13 in the cylinder and secured by a retaining member 14. Onto the hollow piston 12 is secured a hollow counter piston rod 15 passing through the fixed diaphragm 6 to an annular type counter piston 16 in the second chamber which counter piston is provided with one or more free ports 17 or one or more ports provided with flaps, establishing the necessary communication between the two spaces 2, 2a of the second chamber. The counter piston rod 15 may be grooved over a portion of its length as shown at 18 so that on movement of the sliding assembly in the cylinder access from one side of the diaphragm to the other may also be provided through the said groove 18 in the counter piston rod. Within the hollow piston 12 there is a secondary diaphragm 19 provided with two ports 20, 21, to allow communication from the oil space 2 of the second chamber through the port 22 of the counter piston 16 hence through the hollow counter piston rod 15 into the third chamber 3a. The ports may be, if so desired, and are in the preferred construction, spring controlled.

The ports 20, 21 of the secondary diaphragm may in addition include spring loaded ball valves 20a, 21a which have flats on the outside diameter to allow the fluid to pass, the valve 20a being used during compression and the non-return valve 21a during rebound.

Within the hollow piston rod 9 is a free or floating piston 23 made fluid tight by piston rings 24 which divides the fluid space 3a in the third chamber from the air space 3 therein.

In the second chamber 2, 2a as well as in the third chamber 3, 3a, the oil may be separated from the compressed air by a floating piston or a bellow device.

The shock absorber is filled with oil to a predetermined liquid level above the counter piston 16 and air under pressure is introduced through the inflation valve 5 into the main cylinder 1 above the oil level after admittance of compressed air into the hollow piston rod 9 through the air inflation valve 11. Some liquid can also be introduced into the third chamber 3 to keep the seal at the bottom of said chamber wet and also to control the compression ratio.

On normal closure of the shock absorber at the designed speed, the closing force is resisted initially by the pressure in the oil in the first chamber 1 due to the damping of the orifices 7 in the diaphragm 6 between it and the second chamber 2, and when the closing speed and therefore the damping is reduced by the pressure which has developed by the further compression of oil in the oil space 2 of the second chamber.

If the pressure in this space 2 rises above a predetermined level, the relief valve 20a in the secondary diaphragm 19 will open, forcing the floating piston 23 against the pressure in the air space 3 of the third chamber, producing a further damping without a substantial increase in reaction. On extension, the pressure in the third chamber 3, 3a will force oil from the space 3a into the oil space 2 of the second chamber through the non-return valve 21.

In the preferred embodiment of the invention described, the oil and body of air in each of the second and third chambers constitute resilient means capable of yielding to load pressure and exerting a counter-acting restorative force, thus acting as spring means.

What I claim is:

1. In a shock absorber, means providing a first chamber for containing fluid medium; a load transmitting member mounted for movement in said first chamber for varying the volume thereof effective for containing the fluid medium; means defining a second chamber for containing fluid medium; resilient means in said second chamber capable of yielding to load pressure and exerting a resultant counter-acting restorative force; orifice means providing for flow of the fluid medium from said first chamber to said second chamber; means defining a third chamber; resilient means in said third chamber capable of yielding to load pressure and exerting a resultant counter-acting restorative force; and means including a passage directly connecting said second chamber and said third chamber for enabling flow of fluid medium from said second chamber to said third chamber in response to attainment of a predetermined pressure in said second chamber.

2. In a shock absorber, means providing a first chamber for containing fluid medium; a load transmitting member mounted for movement in said first chamber for varying the volume thereof effective for containing the fluid medium; means defining a second chamber for containing fluid medium; resilient means in said second chamber capable of yielding to load pressure and exerting a resultant counter-acting restorative force; orifice means providing for flow of the fluid medium from said first chamber to said second chamber; means defining a third chamber; resilient means in said third chamber capable of yielding to load pressure and exerting a resultant counter-acting restorative force; and valve means between said second and third chambers for enabling restricted flow of fluid medium from said second chamber to said third chamber in response to attainment of a predetermined pressure in said second chamber.

3. In a shock absorber, means providing a first chamber for containing fluid medium; a load transmitting member mounted for movement in said first chamber for varying the volume thereof effective for containing the fluid medium; means defining a second chamber for containing fluid medium; orifice means providing for flow of the fluid medium from said first chamber to said second chamber; resilient means in said second chamber capable of yielding to load pressure and exerting a resultant counter-acting restorative force; means defining a third chamber; resilient means in said third chamber capable of yielding to load pressure and exerting a resultant counter-acting restorative force; and means including a conduit passing through said first chamber and directly connecting said second chamber and said third chamber for enabling flow of fluid medium from said second chamber to said third chamber in response to attainment of a predetermined pressure in said second chamber.

4. Shock absorber construction as set forth in claim 1 in which at least one of the resilient means comprises a body of compressible fluid.

5. Shock absorber construction as set forth in claim 3 in which at least one of the resilient means comprises a body of compressible fluid.

6. In a shock absorber, means providing a first chamber for containing fluid medium; a load transmitting member mounted for movement in said first chamber for varying the volume thereof effective for containing the fluid medium; means defining a second chamber for containing fluid medium; resilient means in said second chamber capable of yielding to load pressure and exerting a resultant counter-acting restorative force; orifice means providing for flow of the fluid medium from said first chamber to said second chamber; means defining a third chamber; resilient means in said third chamber capable of yielding to load pressure and exerting a resultant counter-acting restorative force; a spring urged valve between said second and third chambers adapted to open only when a predetermined pressure has been created in said second chamber to enable flow of fluid medium from said second chamber to said third chamber without further substantial increase in pressure in said second chamber.

7. Shock absorber construction as set forth in claim 2 in which the first and second chambers are defined in part by a cylinder and a partition therein separating said first and second chambers, the orifice means being formed in the partition; and the movable member comprising a piston reciprocable in said cylinder on the first chamber side of said partition, a hollow piston rod being connected to said piston and extending through said partition to provide communication between said second and third chambers under control of said valve means.

8. Shock absorber construction as set forth in claim 2 in which the first and second chambers are defined in part by a cylinder and a partition therein separating said first and second chambers, the orifice means being formed in the partition; and the movable member comprising a piston reciprocable in said cylinder on the first chamber side of said partition, a hollow piston rod being connected to said piston and extending through said partition to provide communication between said second and third chambers under control of said valve means, in combination with a counter piston carried by said piston rod and being reciprocable in said second chamber and dividing said second chamber into two spaces.

9. Shock absorber construction as set forth in claim 2 including a floating piston mounted for free movement in said third chamber and dividing the latter into two spaces one of which contains said fluid medium and is adapted to communicate with said second chamber through said valve means, and the other of which contains air.

10. In a shock absorber, a cylinder; a hollow piston reciprocable in said cylinder; a partition in said cylinder which, conjointly with said cylinder and said piston, defines a first chamber; a second chamber in said cylinder on the side of said partition opposite said first chamber; orifice means in said partition for enabling flow of fluid medium from said first chamber to said second chamber consequent upon movement of said piston towards said partition; a third chamber within said hollow piston; resilient means in said third chamber capable of yielding to load pressure and exerting a resultant counter-acting restorative force; and means providing for flow of fluid from said second chamber to said third chamber including a normally closed valve adapted to open in response to attainment of a predetermined pressure in said second chamber.

11. In a shock absorber, a cylinder; a hollow piston reciprocable in said cylinder; a partition in said cylinder which, conjointly with said cylinder and said piston, defines a first chamber; a second chamber in said cylinder on the side of said partition opposite said first chamber; orifice means in said partition for enabling flow of fluid medium from said first chamber to said second chamber consequent upon movement of said piston towards said partition; a third chamber within said hollow piston; a floating piston in said third chamber and dividing said third chamber into two spaces; means providing for flow of fluid from said second chamber to one of the two spaces constituting said third chamber including a normally closed valve adapted to open in response to attainment of a predetermined pressure in said second chamber; and a body of air in the other of the two spaces constituting said third chamber.

ROBERT GEORGE HOARE.

REFERENCES CITED

The following references are of record in the file of this patent:

UNITED STATES PATENTS

| Number | Name | Date |
| --- | --- | --- |
| 2,191,359 | Thornhill | Feb. 20, 1940 |
| 2,243,782 | Thornhill | May 27, 1941 |
| 2,333,550 | Parker | Nov. 2, 1943 |

FOREIGN PATENTS

| Number | Country | Date |
| --- | --- | --- |
| 866,370 | France | Aug. 4, 1941 |